(12) United States Patent
Yang

(10) Patent No.: US 7,891,855 B2
(45) Date of Patent: Feb. 22, 2011

(54) LIGHT GUIDING STRUCTURE FOR CONNECTOR

(75) Inventor: Haven Yang, Chung Ho (TW)

(73) Assignee: All Best Electronics Co., Ltd. (TW)

( * ) Notice: Subject to any disclaimer, the term of this patent is extended or adjusted under 35 U.S.C. 154(b) by 134 days.

(21) Appl. No.: 12/411,573

(22) Filed: Mar. 26, 2009

(65) Prior Publication Data

US 2010/0246170 A1    Sep. 30, 2010

(51) Int. Cl.
*F21V 7/04* (2006.01)
(52) U.S. Cl. .................. 362/616; 362/560; 362/618; 362/624; 362/627
(58) Field of Classification Search .......... 362/560, 362/615–616, 618, 622, 624, 627
See application file for complete search history.

(56) References Cited

U.S. PATENT DOCUMENTS 5,327,328 A * 7/1994 Simms et al. ................. 362/26
7,329,034 B2 * 2/2008 Verdes et al. ............... 362/555

* cited by examiner

*Primary Examiner*—Sandra L O Shea
*Assistant Examiner*—Meghan K Dunwiddie
(74) *Attorney, Agent, or Firm*—Schmeiser, Olsen & Watts, LLP

(57) ABSTRACT

A light guiding structure for connector includes a light-guiding unit having more than one light guiding post, and each of the light guiding posts having a light-input end and a light-output end; and a shielding unit enclosing an outer side of the light guiding posts. When the light guiding structure is mounted on a connector case for guiding light, light beams propagating in different light guiding posts are isolated from one another by the shielding unit. Therefore, light beams can be stably and exactly guided by the light guiding posts without light loss and mutual interference to thereby avoid error determination by a user.

3 Claims, 7 Drawing Sheets

A

LIGHT GUIDING STRUCTURE FOR CONNECTOR

FIELD OF THE INVENTION

The present invention relates to a light guiding structure for connector, and more particularly to a light guiding structure having light guiding posts enclosed in a shielding unit, so that light beams can stably and exactly propagate in the light guiding posts without light loss and mutual interference to cause error determination by a user.

BACKGROUND OF THE INVENTION

As can be seen from FIGS. 8 and 9, a conventional light-guiding unit 5 for connector includes more than one light guiding post 51. Each of the light guiding posts 51 is made of a light transmitting material. When the light-guiding unit 5 is mounted to a connector case, light beam from a light source can be guided by the light guiding post 51 to a light-output end thereof.

Since the light guiding posts 51 are made of a light transmitting material, when the light beam emitted from a light-emitting element 6 corresponding to a first one of the light guiding posts 51, either a left one or a right one, enters the light guiding post 51, the light beam is subject to light loss when propagating along a path defined in the light guiding post 51. Part of the lost light beam is received by the second light guiding post 51 that does not receive a light beam from a light source thereof. That is, the second light guiding post 51 is interfered by the light beam propagating in the first light guiding post 51. As a result, both of the two light guiding posts 51 are lightened at their light-output end, which will cause error determination by a user using the connector. On the other hand, when the two light guiding posts 51 on the light-guiding unit 5 guide light beams at the same time, light beams from the two light-emitting elements 6 separately corresponding to the two light guiding posts 51 are also subject to light loss during propagating in the light guiding posts 51, so that the two light guiding posts 51 mutually interfere with each other. Under this situation, light beams could not be stably and exactly guided to the light-output ends of the two light guiding posts 51, and only a relatively weak light can be seen at the light-output ends. Therefore, the light-guiding unit 5 fails to perform its light guiding function in practical use thereof.

It is therefore desirable to develop a light guiding structure for connector that can stably and exactly guide light beams to avoid possible error determination by a user due to weak light shown at the light guiding posts.

SUMMARY OF THE INVENTION

A primary object of the present invention is to provide a light guiding structure being mounted to a connector case for stably and exactly guiding light beams to light-input ends of two light guiding posts without light loss and mutual interference, so that error determination by a user can be avoided.

To achieve the above and other objects, the light guiding structure for connector according to the present invention includes a light-guiding unit having more than one light guiding post, and each of the light guiding posts having a light-input end and a light-output end; and a shielding unit enclosing an outer side of the light guiding posts.

When the light guiding structure is mounted on a connector case for guiding light, light beams propagating in different light guiding posts are isolated from one another by the shielding unit. Therefore, light beams can be stably and exactly guided by the light guiding posts without light loss and mutual interference to cause error determination by a user.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
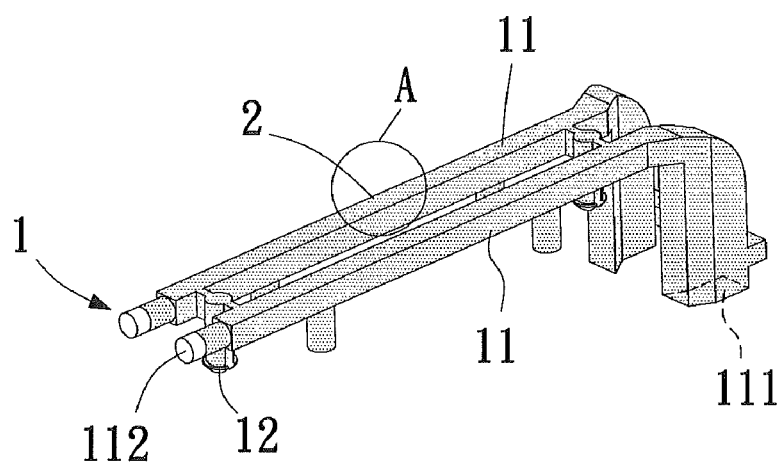
FIG. 1 is a perspective view of a light guiding structure for connector according to a preferred embodiment of the present invention.
Figure 2:
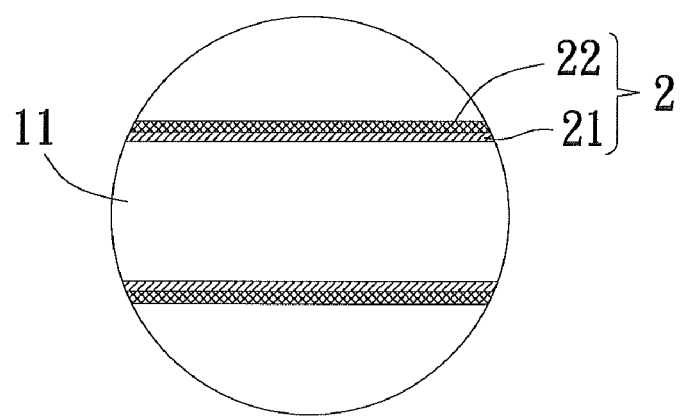
FIG. 2 is an enlarged sectional view of the circled area "A" of FIG. 1.

Please refer to FIG. 1 that is a perspective view of a light guiding structure for connector according to a preferred embodiment of the present invention, and to FIG. 2 that is an enlarged sectional view of the circled area "A" of FIG. 1. As shown, the light guiding structure for connector according to the present invention includes at least a light-guiding unit 1 and a shielding unit 2.

The light-guiding unit 1 each includes more than one light guiding post 11. In the illustrated preferred embodiment, the light-guiding unit 1 each includes two light guiding posts 11 arranged side-by-side. Each of the light guiding posts 11 has a light-input end 111 and a light-output end 112. And, a locking section 12 is provided on a lower side of the light-guiding unit 1 at a predetermined position.

The shielding unit 2 encloses an outer side of the light guiding posts 11 of the light-guiding unit 1, and includes at least a reflecting layer 21 directly covering the outer side of each of the light guide posts 11 and a light-absorbing layer 22 formed on the reflecting layer 21. In the present invention, the reflecting layer 21 can be formed of an aluminum material or a silver material; and the light-absorbing layer 22 can be a layer of colored paint.

Figure 3:
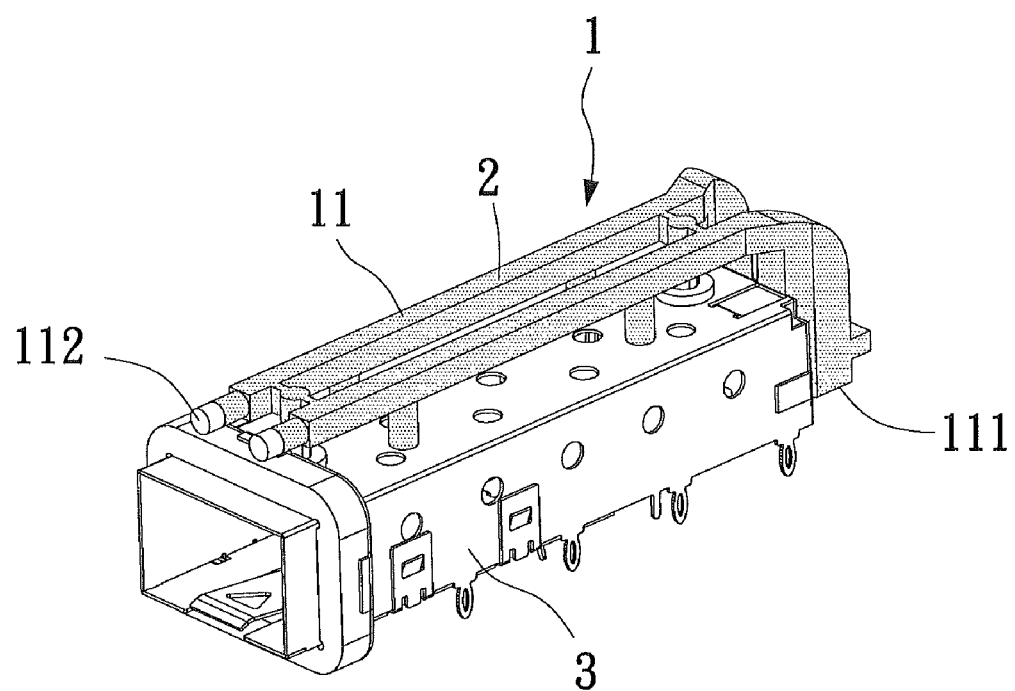
FIG. 3 is a perspective view showing a first example of using the light guiding structure of the present invention.
Figure 6:
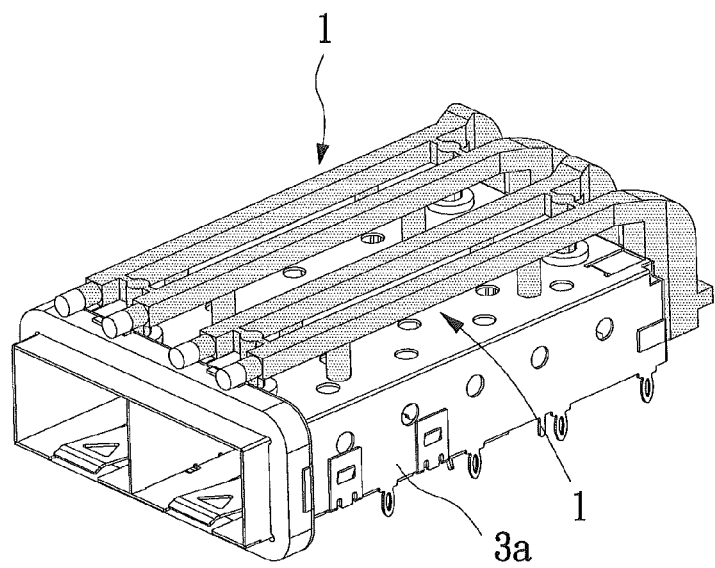
FIG. 6 is an assembled perspective view showing a second example of using the light guiding structure of the present invention.
Figure 7:
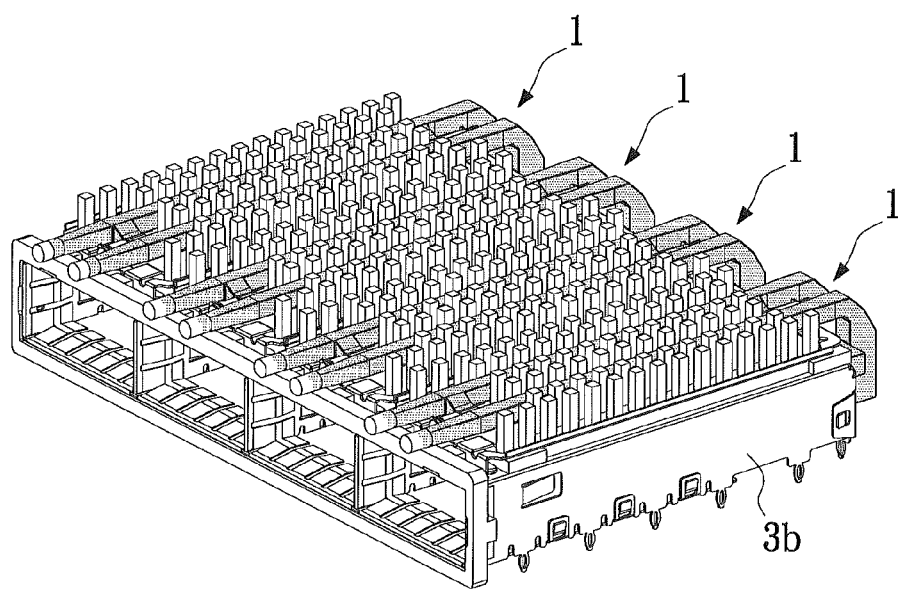
FIG. 7 is an assembled perspective view showing a third example of using the light guiding structure of the present invention.
Figure 8:
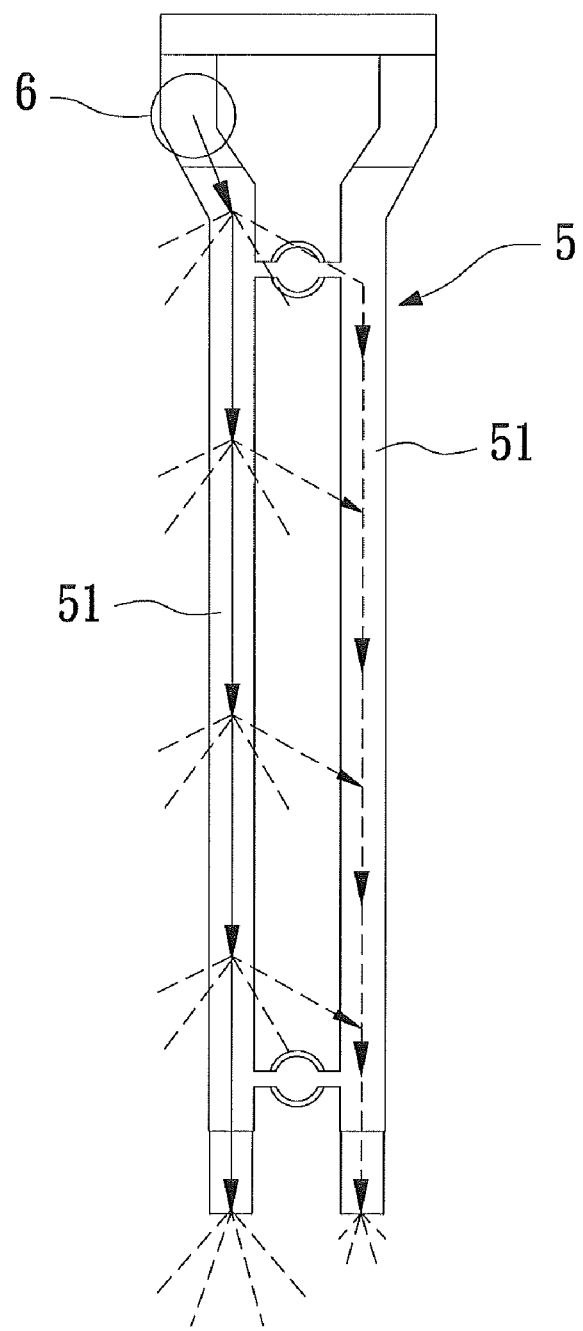
FIG. 8 shows a light beam propagates in a conventional light-guiding unit.
Figure 9:
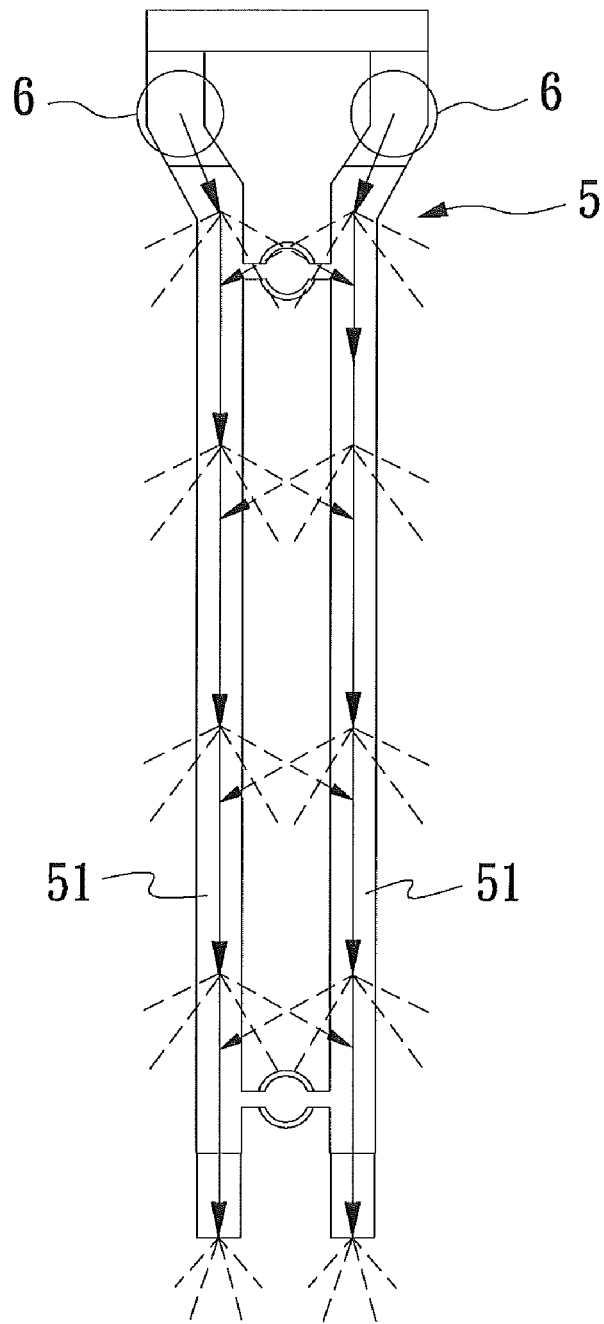
FIG. 9 shows two light beams propagate in a conventional light-guiding unit.

FIG. 3 is a perspective view showing a first example of using the light guiding structure of the present invention. As shown, there is one single light-guiding unit 1 mounted to an connector case 3 with the locking section 12 of the light-guiding unit 1 locked to the connector case 3, so as to guide light beams through the light guiding posts 11. Different numbers of light guiding structure of the present invention can be mounted to differently sized connector case. FIG. 6 shows a second example of using the light guiding structure of the present invention to guide light, in which two light-guiding units 1 are mounted on an connector case 3a providing two sockets; and FIG. 7 shows a third example of using the light guiding structure of the present invention to guide light, in which four light-guiding units 1 are mounted on an connector case 3b providing four sockets. Of course, more than four light-guiding units 1 can be used with other large-sized connector case (not shown).

Figure 4:
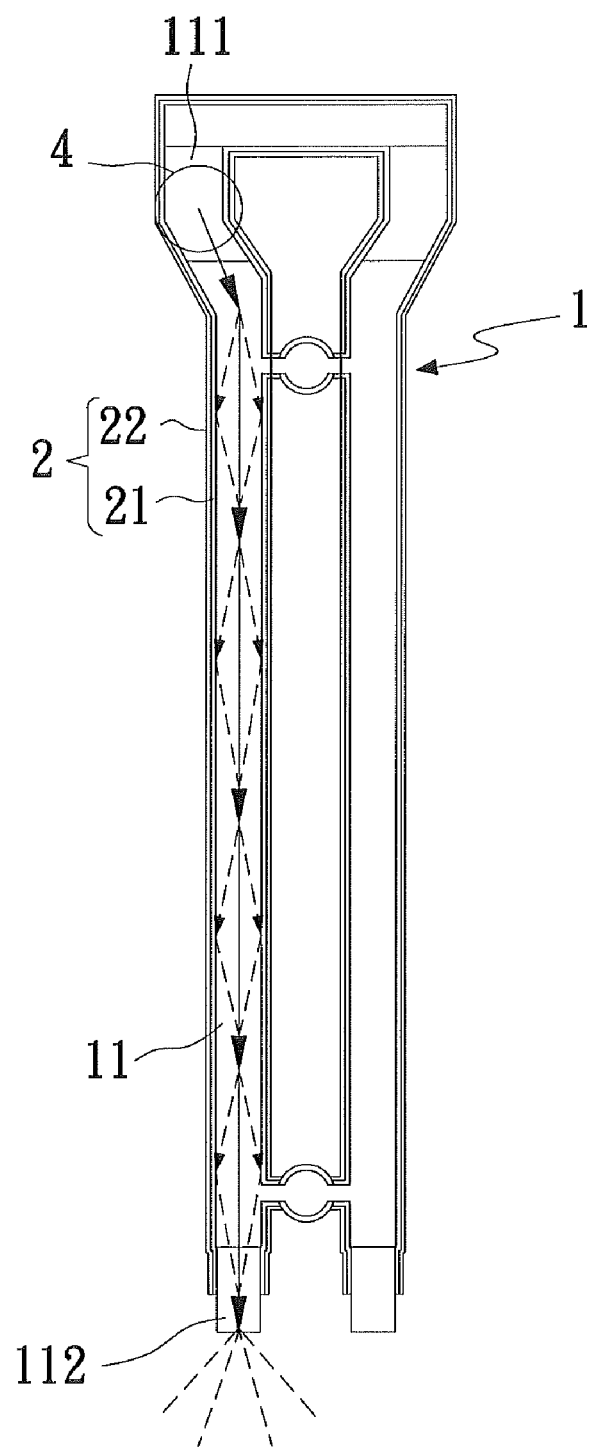
FIG. 4 is a sectional view showing a light beam emitted from a light source propagates forward in the light guiding structure of the present invention.

When only one of the two light guiding posts 11, either the left or the right one, in the light-guiding unit 1 is used to guide light, as shown in FIG. 4, a light beam emitted from a light-emitting element 4 provided on that light guiding post 11 enters the light guiding post 11 via the light-input end 111 thereof and is guided by the light guiding post 11 to exit from the light-out end 112 of the light guiding posit 11. Since the light guiding post 11 is enclosed in the shielding unit 2, the light beam from the light-emitting element 4 entering the light guiding post 11 via the light-input end 111 is reflected within the light guiding post 11 by the reflecting layer 21 and sealed in the light guiding post 11 by the light-absorbing layer 22, so that the input light beam propagates forward along a path defined in the light guiding post 11 and finally exits the light guiding post 11 at the light-output end 112. That is, with the shielding unit 2 provided outside the light-guiding unit 1, light beam emitted from the light-emitting element 4 and propagating in the light guiding post 11 is prevented from light loss during propagation. Therefore, the light beam can be stably and exactly guided to the light-output end 112 without interfering with the other light guiding post 11 to cause error determination by a user.

Figure 5:
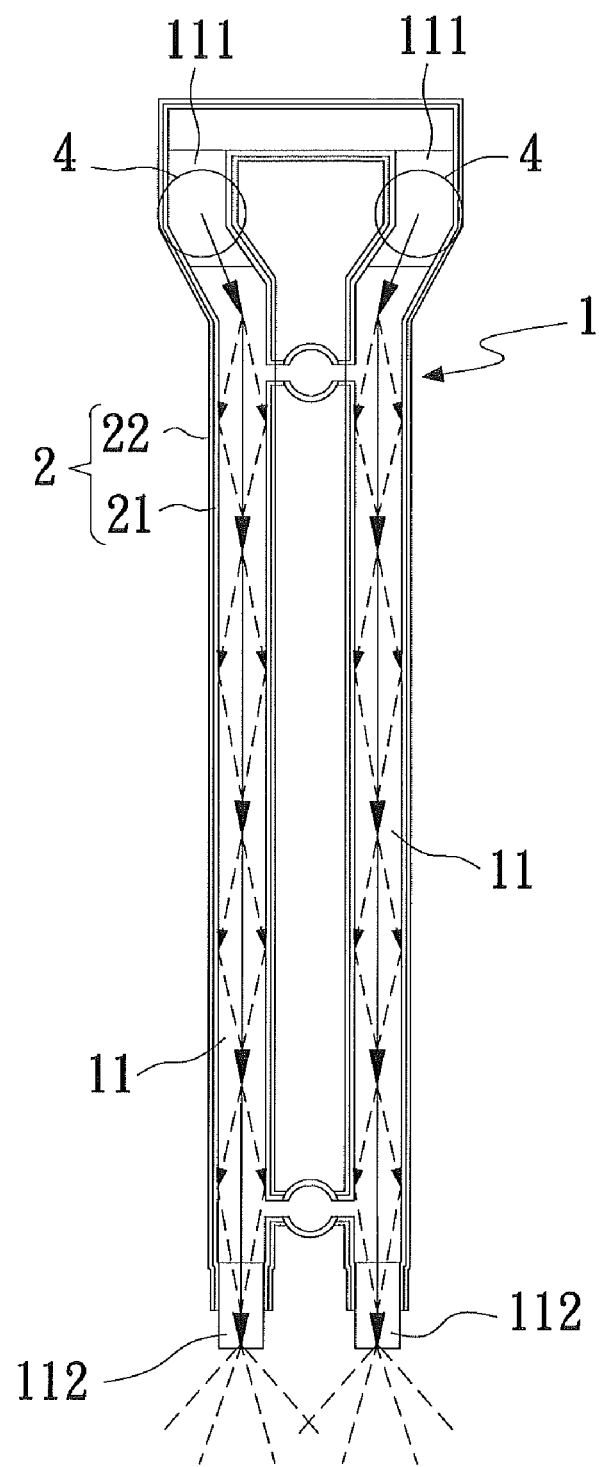
FIG. 5 is a sectional view showing light beams from two different light sources propagate forward in the light guiding structure of the present invention.

In the case both of the two light guiding posts 11 in the light-guiding unit 1 are used to guide light beams, as shown in FIG. 5, light beams from two light-emitting elements 4 separately provided on the two light guiding posts 11 enter the corresponding light guiding posts 11 via the light-input end 111 thereof. The light beam entering each of the two light guiding posts 11 is reflected within the light guiding post 11 by the reflecting layer 21 and sealed in the light guiding post 11 by the light-absorbing layer 22, so that the input light beam propagates forward along a path defined in the light guiding post 11 and finally exits the light guiding post 11 at the light-output end 112 thereof. That is, with the shielding unit 2 provided outside the light-guiding unit 1, light beams emitted from the two light-emitting elements 4 and propagating in the two light guiding posts 11 are prevented from light loss and mutual interference with each other while propagating in the light guiding posts 11. Therefore, the light beams can be stably and exactly guided to the light-output ends 112.

With the above arrangements, the light guiding structure for connector according to the present invention is novel and improved because the light beams propagating in the light guiding posts are isolated from one another by the shielding layer without light loss or mutual interference. Therefore, light beams can be stably and exactly guided by the light guiding posts to avoid error determination by a user. It is expected products derived from the present invention can meet the demands in the market.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A light guiding structure for connector, comprising:
   a light-guiding unit including more than one light guiding post, each of the light guiding posts including a light-input end and a light-output end; and
   a shielding unit enclosing an outer side of the light guiding posts of the light-guiding unit, wherein the shielding unit includes at least a reflecting layer enclosing the outer side of the light guiding posts, and a light-absorbing layer formed on the reflecting layer.

2. The light guiding structure for connector as claimed in claim 1, wherein the light-guiding unit is provided on a lower side with a locking section.

3. The light guiding structure for connector as claimed in claim 1, wherein the reflecting layer is selected from the group consisting of an aluminum layer and a silver layer, and the light-absorbing layer is a layer of colored paint.

* * * * *